United States Patent [19]

Ogawa et al.

[11] 4,186,228
[45] Jan. 29, 1980

[54] MAGNETIC RECORDING MEDIUM

[75] Inventors: Hiroshi Ogawa; Matsuaki Nakamura; Yasuo Tamai, all of Odawara, Japan

[73] Assignee: Fuji Photo Film Co., Ltd., Minami-ashigara, Japan

[21] Appl. No.: 940,241

[22] Filed: Sep. 7, 1978

[30] Foreign Application Priority Data

Sep. 19, 1977 [JP] Japan ............................. 52-112399

[51] Int. Cl.$^2$ ............................................ H01F 10/02
[52] U.S. Cl. ............................... 428/413; 252/62.54; 428/457; 428/538; 428/539; 428/900
[58] Field of Search ............................. 427/127–132, 427/48; 252/62.54; 428/900, 413, 457, 539, 538

[56] References Cited

U.S. PATENT DOCUMENTS 3,987,232  10/1976  Huguenard et al. ................. 428/900

Primary Examiner—Bernard D. Pianalto
Attorney, Agent, or Firm—Sughrue, Rothwell, Mion, Zinn and Macpeak

[57] ABSTRACT

A magnetic recording medium comprising a non-magnetic support having thereon a magnetic recording layer containing a finely divided ferromagnetic powder, a binder and at least one 1,2-epoxyalkane represented by the general formula (I)

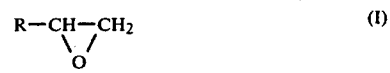

wherein R represents an alkyl group having 10 to 30 carbon atoms; in an amount of about 0.05 to about 3 parts by weight per 100 parts by weight of the ferromagnetic powder.

6 Claims, 1 Drawing Figure

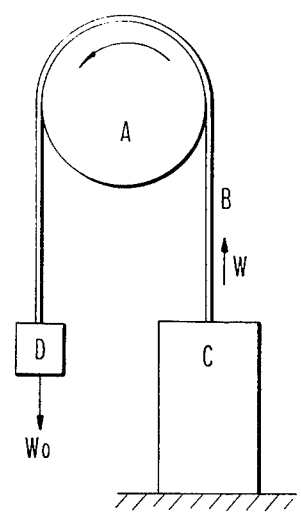

4,186,228

MAGNETIC RECORDING MEDIUM

BACKGROUND OF THE INVENTION

1. Field of the Invention

The present invention relates to a magnetic recording medium and, particularly, to a magnetic recording medium having excellent lubricating properties and running properties.

2. Description of the Prior Art

In magnetic recording media and, particularly, in audio cassette tapes, the tape runs at a low speed in contact with a fixed head.

Recently, since high performance characteristics are required for cassette tapes, the surface of the magnetic recording layer is smoothened to improve the contact with the head and to improve high frequency properties.

However, in prior art tapes, since the friction due to the head is high, the running of the tape grows worse with "squeaking" occurring and, in some cases, tape running stops.

Hitherto, in order to reduce the coefficient of friction of the magnetic recording layer, higher fatty acids, higher fatty acid esters, paraffin hydrocarbons or silicone oils have been added to the magnetic coating containing a ferromagnetic powder and a binder. These additives are described in Japanese Pat. Nos. 18064/66, 186/68, 669/68 and 15624/72, and U.S. Pat. Nos. 2,654,681, 3,470,021, 3,497,411, 3,525,694 and 3,634,253.

However, it is impossible to provide video tapes with sufficient lubrication properties and durability using these additives. Further, a "blooming" phenomenon easily occurs, by which these additives exude on the surface of the magnetic recording layer to cause adhesion of the tapes during storage.

Further, mineral oils, vaseline or paraffin waxes as described in U.S. Pat. No. 3,525,694 and Japanese Pat. No. (OPI) 84405/74 (The term "OPI" as used herein refers to a "published unexamined Japanese patent application".), can be used as lubricants.

However, the lubrication properties resulting from the use of these lubricants is still not sufficient. Further, since these lubricants have a remarkably poor compatibility with the binder, dispersion of the finely-divided ferromagnetic powder is often hindered with the squareness ratio of the magnetic recording layer decreasing as a result.

Moreover, a white powder often forms on the surface of the tapes or adhesion of the tapes often occurs because of the blooming phenomenon.

SUMMARY OF THE INVENTION

A first object of the present invention is to provide magnetic recording media which have excellent lubrication properties and stable running properties.

A second object of the present invention is to provide audio cassette tapes with which tape squeaking does not occur.

A third object of the present invention is to provide a magnetic recording media in which blooming does not occur.

As a result of research on the above, it has now been found that remarkably excellent results are obtained when 1,2-epoxyalkanes represented by the following general formula (I)

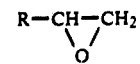   (I)

wherein R represents an alkyl group having 10 to 30 carbon atoms, are used as additives in the magnetic recording layer.

Accordingly, the present invention provides a magnetic recording medium comprising a non-magnetic support having thereon a magnetic recording layer containing a finely divided ferromagnetic powder, a binder and at least one 1,2-epoxyalkane represented by the general formula (I)

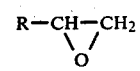   (I)

wherein R represents an alkyl group having 10 to 30 carbon atoms, in an amount of about 0.05 to about 3 parts by weight per 100 parts by weight of the ferromagnetic powder.

BRIEF DESCRIPTION OF THE DRAWING

The FIGURE is a rough plan of an apparatus for measuring the coefficient of kinetic friction used in the Examples of the present invention, wherein A represents a Permalloy bar, B represents a sample tape, C represents a tension detecting means, D represents a weight load, Wo represents the load of the weight D and W represents the tension.

DETAILED DESCRIPTION OF THE INVENTION

Examples of suitable alkyl groups having 10 to 30 carbon atoms represented by R in the 1,2-epoxyalkane represented by the general formula (I) used in the present invention include straight chain alkyl groups represented by the formula $CH_3\text{-}(CH_2)_n CH_2\text{-}$ wherein n represents an integer of 8 to 28 and branched alkyl groups thereof, such as decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl or triacontyl, etc.

Specific examples of 1,2-epoxyalkanes represented by the general formula (I) are set forth below.

(I-1):
1,2-Epoxydodecane
(number of carbon atoms in R=10)

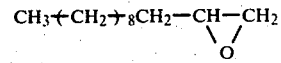

(I-2):
1,2-Epoxytetradecane
(number of carbon atoms in R=12)

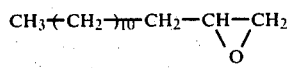

(I-3):
1,2-Epoxyhexadecane
(number of carbon atoms in R=14)

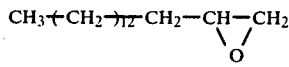

(I-4):
1,2-Epoxyoctadecane
(number of carbon atoms in R=16)

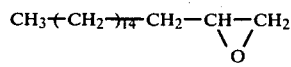

(I-5):
1,2-Epoxydocosane
(number of carbon atoms in R=20)

(I-6):
1,2-Epoxydotriacontane
(number of carbon atoms in R=30)

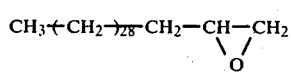

If the number of carbon atoms of the alkyl group (R) in the 1,2-epoxyalkane is less than 10, good lubrication properties can not be obtained and tape squeaking can not be prevented. If the number of carbon atoms in R is over 30, blooming easily occurs.

Of these alkyl groups, particularly preferred alkyl groups are straight chain alkyl groups having 10 to 20 carbon atoms.

The 1,2-epoxyalkane represented by the general formula (I) used in the present invention is employed in an amount of about 0.05 to 3 parts by weight and preferably 0.1 to 1 parts by weight based on 100 parts by weight of the finely divided ferromagnetic powder, and with this amount the objects of the present invention are attained. If the amount is less than about 0.05 parts by weight, less reduction in tape squeaking can be obtained, and if the amount is more than 3 parts by weight, blooming easily occurs. Further, it is possible to use two or more 1,2-epoxyalkanes represented by the general formula (I) together in the above described amount in the present invention.

The 1,2-epoxyalkanes used in the present invention can be synthesized by oxidation of α-olefins prepared under normal pressure by cracking of paraffin wax or oligomerization of ethylene with peroxides such as hydrogen peroxide or organic peracids. Suitable synthesis processes are described in D. Swern et al, *Journal of the American Chemical Society*, 68 1504 (1946); D. Swern et al, *Chemical Reviews*, 45 (1949); D. Swern et al, *Organic Reactions*, 7 378 (1953); H. C. Wohlers et al, *Industrial Engineering Chemistry*, 50 1685 (1958); Masuo and Kato, *Yukigosei Kagaku*, 26 367 (1968); Takagi et al, *Kogyokagaku Zasshi*, 69 1080 (1966); Takagi et al, ibid, 16 1446 (1967 and *Yukagaku*, 16 462 (1967).

In some cases, although up to about 10% by weight of an α-olefin glycol having the structure

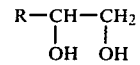

is present as an impurity in the 1,2-epoxyalkane represented by the general formula (I) of the present invention, the effect of the present invention is not impaired by such impurity.

The magnetic recording media of the present invention are produced by coating a magnetic recording layer coating composition which is prepared by blending a finely divided ferromagnetic powder, a binder and at least one 1,2-epoxyalkane represented by the above described general formula (I) using an organic solvent on a nonmagnetic support and drying the coating to form a coated magnetic recording layer.

Processes for preparing magnetic coating compositions used for the above described magnetic recording layer are described in detail in Japanese Pat. No. 15/60, 2679/64, 186/68, 28043/72, 28045/72, 28046/72, 28048/72, 31445/72, 11162/73, 21331/73 and 33683/73, U.S.S.R. Pat. No. 308,033 and U.S. Pat. Nos. 2,581,414, 2,855,156, 3,240,621, 3,526,598, 3,728,262, 3,790,407 and 3,836,393, etc. The magnetic coating compositions described therein comprise a finely-divided ferromagnetic powder, a binder and a coating solvent as main components and, in some cases, additives such as a dispersing agent, a lubricant, an abrasive, or an antistatic agent, etc. are also present.

Typical examples of finely divided ferromagnetic powders which can be employed in the present invention are ferromagnetic iron oxides, ferromagnetic chromium dioxides, ferromagnetic alloy powders and the like.

Suitable ferromagnetic iron oxides are ferromagnetic iron oxides having an x value within the range of $1.33 \leq x \leq 1.50$ when the iron oxides are represented by the formula $FeO_x$, i.e., maghemite (gamma-$Fe_2O_3$, $x=1.50$), magnetite ($Fe_3O_4$, $x=1.33$) and the Bertholide compounds thereof ($FeO_x$, $1.33 < x < 1.50$). The x value described above is shown by the following relationship:

$$x = 1/200 \times [2 \times \left(\begin{array}{c}\text{atomic \%}\\ \text{of divalent}\\ \text{iron ions}\end{array}\right) + 3 \times \left(\begin{array}{c}\text{atomic \%}\\ \text{of trivalent}\\ \text{iron ions}\end{array}\right)]$$

Divalent metals can be added to these ferromagnetic iron oxides. Typical examples of suitable divalent metals include Cr, Mn, Co, Ni, Cu, Zn and the like and such can be present in an amount of 0 to about 10 atomic % based on the iron oxides.

Suitable ferromagnetic chromium dioxides which can be employed are $CrO_2$ and $CrO_2$ to which metals such as Na, K, Ti, V, Mn, Fe, Co, Ni, Tc, Ru, Sn, Ce, Pb, etc., semi-conductors such as P, Sb, Te, etc., or oxides of these metals are added in an amount of 0 to about 20 wt%.

A suitable acicular ratio of the ferromagnetic iron oxides and ferromagnetic chromium dioxides described above is about 2:1 to about 20:1, preferably 5:1 to 10:1, with an average length in the range between about 0.2 and about 2.0 μm, preferably 0.5 and 1.5 μm.

The ferromagnetic alloy powders described above comprise at least 75 wt% of the metal component, of which 80 wt % or more of the metal component is at least one ferromagnetic metal (i.e., Fe, Co, Ni, Fe-Co, Fe-Ni, Co-Ni or Co-Ni-Fe) and of which 20 wt% or less, preferably 0.5 to 5 wt%, is an element such as Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P, etc. Further, the ferromagnetic alloy powders may contain a small amount of water, hydroxides or oxides thereof.

The ferromagnetic alloy powders described above are acicular particles comprising a chain of 2 to 20 particles, each particle having a particle size of about 50 to about 1000 Å.

Specific examples thereof are described in Japanese Pat. Nos. 5515/61, 4825/64, 5009/64, 10307/64, 14090/69, 18372/70, 22062/72, 22513/72, 28466/71, 38755/71, 4286/72, 12422/72, 17284/72, 18509/72, 18573/72, and 39639/73, U.S. Pat. Nos. 3,026,215, 2,031,341, 3,100,194, 3,242,005 and 3,389,014, British Pat. Nos. 752,659, 782,762 and 1,007,323, French Pat. No. 1,107,654, German Pat. (OLS) No. 1,281,334, etc.

Suitable binders which can be employed in the present invention are conventionally known thermoplastic resins, thermosetting resins or reactive resins, and mixtures thereof.

Preferred thermoplastic resins which can be used are those having a softening point of not greater than about 150° C., an average molecular weight of from about 10,000 to about 200,000 and a degree of polymerization of about 200 to about 2000. For example, vinyl chloride-vinyl acetate copolymers, vinyl chloride-vinylidene chloride copolymers, vinyl chloride-acrylonitrile copolymers, acrylic acid esters-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, polyvinyl fluorides, vinylidene chloride-acrylonitrile copolymers, butadiene-acrylonitrile copolymers, polyamide resins, polyvinyl butyrals, cellulose derivatives (cellulose acetate butyrate, cellulose diacetate, cellulose triacetate, cellulose propionate, nitrocellulose, etc.), styrene-butadiene copolymers, polyester resins, amino resins, a variety of synthetic rubber type thermoplastic resins (polybutadienes, polychloroprenes, polyisoprenes, styrene-butadiene copolymers, etc.) and mixtures thereof, and the like can be used.

Specific examples of these resins are described in Japanese Pat. Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72 and 27886/73, U.S. Pat. Nos. 3,144,352, 3,419,420, 3,499,789 and 3,713,887.

Suitable thermosetting resins or reactive resins have a molecular weight of not greater than about 200,000 as a coating solution and the molecular weight becomes, after coating and drying, infinite due to reactions, such as condensation, addition, etc. In addition, of these resins, resins which do not soften nor melt until the resins are thermally decomposed are preferred. Specifically, phenol-formaldehyde novolac resins, phenol-formaldehyde resole resins, phenol-furfural resins, xylene-formaldehyde resins, urea resins, melamine resins, drying oil-modified alkyd resins, phenolic resin-modified alkyl resins, maleic acid resin-modified alkyd resins, unsaturated polyester resins, epoxy resins and hardening agents (polyamines, acid anhydrides, polyamide resins and the like), isocyanate terminated polyether moisture hardenable type resins, polyisocyanate prepolymers (compounds having at least three isocyanate groups in one molecule, obtained by reacting diisocyanates and low molecular weight triols; trimers and tetramers of diisocyanates), polyisocyanate prepolymers and resins having an active hydrogen (polyester polyols, polyether polyols, acrylic acid copolymers, maleic acid copolymers, 2-hydroxyethyl methacrylate copolymers, p-hydroxystyrene copolymers, and others), and mixtures thereof, and the like can be used.

Examples of these resins are described in Japanese Pat. Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72, and 28922/72, U.S. Pat. Nos. 3,144,353, 3,320,090, 3,437,510, 3,597,273, 3,781,210 and 3,781,211, etc.

These binders are employed individually or as mixtures thereof and may further contain additives. A suitable mixing ratio of the ferromagnetic powders and binders is about 10 to about 400 parts by weight, preferably 30 to 200 parts by weight, more preferably 15 to 100 parts by weight, of the binder to 100 parts by weight of the ferromagnetic powder.

In addition to the binders described above and the finely divided ferromagnetic powders, the magnetic recording layer may further contain a dispersing agent, a lubricant, an abrasive, an antistatic agent, etc.

Suitable dispersing agents which can be employed are fatty acids having 12 to 18 carbon atoms (e.g., of the formula $R_1COOH$ wherein $R_1$ represents an alkyl or alkenyl group having 11 to 17 carbon atoms) such as caprylic acid, lauric acid, myristic acid, palmitic acid, stearic acid, oleic acid, elaidic acid, linoleic acid, linolenic acid, stearolic acid, etc.; metallic soaps comprising alkali metals (Li, Na, K, etc.) or alkaline earth metals (Mg, Ca, Ba) of the fatty acids described above; fluorine-containing derivatives of the fatty acid esters described above; amides of the fatty acids described above; polyalkylene oxide alkylphosphoric acid esters; lecithin; trialkyl polyolefinoxy quaternary ammonium salts (wherein the alkyl moieties have 1 to 5 carbon atoms, and the olefins are ethylene, propylene, or the like); and the like. In addition, higher alcohols having 12 or more carbon atoms and the sulfuric acid esters thereof can also be employed. These dispersing agents can be employed in an amount ranging from about 0.5 to 20 parts by weight to 100 parts by weight of the binder.

These dispersing agents are specifically described in Japanese Pat. Nos. 28369/64, 17945/69, 7441/73, 15001/73, 15002/73, 16363/73 and 4121/75, U.S. Pat. Nos. 3,387,993 and 3,470,021, etc.

As conventional lubricants, it is possible to use silicone oils such as dialkyl polysiloxanes (in which the alkyl moiety has 1 to 5 carbon atoms), dialkoxy polysiloxanes (in which the alkoxy moiety has 1 to 4 carbon atoms), monoalkylmonoalkoxy polysiloxanes (in which the alkyl moiety has 1 to 5 carbon atoms and the alkoxy moiety has 1 to 4 carbon atoms), phenyl polysiloxanes or fluoroalkyl polysiloxanes (in which the alkyl moiety has 1 to 5 carbon atoms), etc.; finely-divided electroconductive powders such as graphite, etc.; finely-divided inorganic powders such as molybdenum disulfide or tungsten disulfide, etc.; finely-divided synthetic resin powders such as polyethylene, polypropylene, polyethylene-vinyl chloride copolymers or polytetrafluoroethylene, etc.; α-olefin polymers; unsaturated aliphatic hydrocarbons which are liquid at normal temperature (e.g., compounds containing terminal n-olefinic double bonds and having 15 to 22 carbon atoms); aliphatic acid esters composed of monobasic aliphatic acids having 12 to 20 carbon atoms and monohydric alcohols having 3 to 12 carbon atoms, and fluorocarbons, etc. These lubricants are employed in a range of about 0.2 to about 3 parts by weight based on 100 parts by weight of the ferromagnetic powder. These lubricants are described in Japanese Pat. Nos. 29709/59, 11033/63, 23889/68, 40461/71, 15621/72, 18482/72, 28043/72, 30207/72, 32001/72, 7442/73, 14247/74, 5042/75, 14082/77 and 18561/77, Japanese Pat. (OPI) Nos. 8804/77, 49803/77, 49804/77, 49805/77, 67304/77 and 70811/77, U.S. Pat. Nos. 2,654,681, 3,470,021, 3,492,235, 3,497,411, 3,523,086, 3,625,760, 3,630,772, 3,634,253, 3,642,539, 3,687,725, 3,996,407, 4,007,313, 4,007,314, 4,018,967 and 4,018,968, *IBM Technical Disclosure Bulletin,* Vol. 9, No. 7, Page 779 (December 1966), and *ELEKTRONIC* 1961, No. 12, Page 380. The 1,2-epoxyalkane used in the present invention can be used together with the above-described lubricants.

Suitable abrasives which can be employed are those generally used, e.g., fused alumina, silicon carbide, chromium oxide, corrundum, artificial corrundum, diamond, artificial diamond, garnet, emery (main components: corrundum and magnetite), etc. Abrasives which have a Moh's hardness of about 5 or more and an average particle size of about 0.05 to about 5 μm, preferably 0.1 to 2 μm, are generally employed. These abrasives can be employed in an amount of about 0.5 to about 20 parts by weight to 100 parts by weight of the binder.

These abrasives are specifically described in Japanese Pat. Nos. 18572/72, 15003/73, 15004/73 (corresponding to U.S. Pat. No. 3,617,378), 39402/74 and 9401/75, U.S. Pat. Nos. 3,007,807, 3,041,196, 3,293,066, 3,630,910 and 3,687,725, British Pat. No. 1,145,349, German Pat. No. (DT-PS) 853,111 and 1,101,000, etc.

Suitable antistatic agents which can be employed are electrically conductive finely divided powders such as carbon black, carbon black graft polymers, etc.; natural surface active agents such as saponin, etc.; nonionic surface active agents such as alkylene oxide type, glycerin type, glycidol type, etc. surface active agents; cationic surface active agents such as higher alkylamines, quaternary ammonium salts, pyridine and other heterocyclic compounds, phosphonium or sulfoniums, etc.; anionic surface active agents containing acidic groups such as carboxylic acid, sulfonic acid, phosphoric acid, sulfuric acid ester, phosphoric acid ester groups, etc.; amphoteric surface active agents such as aminoacids, aminosulfonic acids, sulfuric acid or phosphoric acid esters of aminoalcohols, etc.

The electrically conductive finely divided powders described above can be employed in an amount ranging from about 0.2 to about 20 parts by weight and the surface active agents can be employed in an amount ranging from about 0.1 to about 10 parts by weight, each to 100 parts by weight of the binder.

Some examples of electrically conductive finely divided powders as well as surface active agents which can be employed as antistatic agents are described in Japanese Pat. Nos. 22726/71, 24881/72, 26882/72, 15440/73 and 26761/73, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, German Pat. No. (OLS) 1,942,665, British Pat. Nos. 1,077,317 and 1,198,450, Oda Ryohei, *Kaimen Kasseizai no Gosei to Sono Oyo* (*Synthesis of Surface Active Agents and their Application*), Maki Shoten, Tokyo (1964), A. M. Schwartz and J. W. Perry, *Surface Active Agents,* Interscience Publications Inc. (1958), J. P. Sisley, *Encyclopedia of Surface Active Agents,* vol. 2, Chemical Publishing Co. (1964), *Kaimen Kasseizai Binran* (*Handbook of Surface Active Agents*), 6th Edition, Sangyo Tosho K.K. (Dec. 20, 1966), etc.

These surface active agents can be employed individually or in combination. The surface active agents are also employed as antistatic agents and on some occasions, are employed for other purposes, e.g., for dispersing, improving the magnetic properties, and improving lubrication and as coating aids.

The magnetic recording layer of the present invention can be formed by dissolving the components of the composition described above in organic solvents, kneading and dispersing to prepare respective coating solutions, coating the resulting coating solutions onto a non-magnetic support and then drying. Orientation of the ferromagnetic powders in each of the magnetic recording layers can also be performed after coating the magnetic recording layers before drying the magnetic recording layers. Further, treatments to smoothen the surfaces of each of the magnetic recording layers can also be performed after drying.

Suitable materials for the non-magnetic support which can be employed are polyesters such as polyethylene terephthalate, polyethylene-2,6-naphthalate, etc., polyolefins such as polypropylene, etc.; cellulose deirvatives such as cellulose triacetate, cellulose diacetate, etc.; synthetic resins such as polycarbonates, polyimides, etc.

Suitable organic solvents which can be used as the coating solvent, include ketones such as acetone, methyl ethyl ketone, methyl isobutyl ketone or cyclohexanone, etc., alcohols such as methanol, ethanol, propanol or butanol, etc., esters such as methyl acetate, ethyl acetate, butyl acetate, ethyl lactate or glycol acetate monoethyl ether, etc., ethers and glycol ethers such as diethyl ether, glycol dimethyl ether, glycol monoethyl ether or dioxane, etc., aromatic hydrocarbons such as benzene, toluene or xylene, etc., and chlorinated hydrocarbons such as methylene chloride, ethylene chloride, carbon tetrachloride, chloroform, ethylene chlorohydrin or dichlorobenzene, etc.

The ferromagnetic powder is blended with the above described binder, 1,2-epoxyalkane dispersing agent, lubricant, abrasive, antistatic agent and solvent to prepare a magnetic coating.

In the blending, the ferromagnetic powder and each of the components described above can be put in a blender at the same time or in succession. For instance, a ferromagnetic powder can be added to a solvent containing a dispersing agent and blended for a prescribed period of time to prepare a magnetic coating composition.

Various kinds of blenders can be used to blend the magnetic coating. For example, a two-roll mill, a three roll mill, a ball mill, a pebble mill, a trommel mill, a sand grinder, a Szegvari attritor, a high speed impeller mixer, a high speed stone mill, a high speed impact mill, a disper, a kneader, a high speed mixer, a homogenizer or an ultrasonic dispersing machine, etc. can be used.

Suitable blending techniques are described in T. C. Patton, *Paint Flow and Pigment Dispersion,* John Wiley & Sons Co. (1964), and also U.S. Pat. Nos. 2,581,414 and 2,855,156.

Suitable materials for the nonmagnetic support which can be used include not only polyesters such as polyethylene terephthalate or polyethylene-2,6-naphthalate, etc., polyolefins such as polyethylene or polypropylene, etc., cellulose derivatives such as cellulose triacetate, cellulose diacetate, cellulose acetate butyrate or cellulose proprionate etc., vinyl resins such as polyvinyl chloride or polyvinylidene chloride, etc. and synthetic resins such as polycarbonates, polyimides or polyamide imides, etc., but also nonmagnetic metals such as aluminum, copper, tin, zinc or nonmagnetic alloys containing these metals, etc., ceramics such as glass, porcelain or china, etc., and papers such as paper or coated or laminated paper prepared by coating or laminating baryta or α-polyolefins having 2 to 10 carbon atoms such as polyethylene, polypropylene or ethylene-butene copolymers, etc. depending on the end use. These nonmagnetic supports may be transparent or opaque depending on the purpose of use.

Further, the nonmagnetic support may have any shape such as that of a film, tape, sheet, disk, card and drum, and various materials are selected, as desired, according to the shape.

A suitable thickness of these nonmagnetic supports is about 2 to 50 μm or so and preferably 3 to 25 μm as films, tapes or sheets. Further, a suitable thickness is about 0.5 to 10 mm as disks or cards. Where the shape is that of a drum, they are cylindrical, with the shape depending upon the recorder to be used.

Further, the reverse side (back surface) to the side of the support on which the magnetic recording layer is coated may be back-coated in order to prevent electrostatic charging, to prevent print-through, to prevent wow and flutter, to improve the strength of the magnetic recording medium or to form a mat surface on the back face.

This back layer can be provided by coating a solution which is prepared by blending at least one additive of the lubricants, abrasives and antistatic agents, etc. described above, and, if desired, a dispersing agent for homogeneously dispering these additives with the above-described binder and the coating solvent, on the back face of the support and drying. Either the magnetic recording layer or the back layer may be provided first on the support.

Preferred additives generally used in the back layer are carbon black, graphite, talc, $Cr_2O_3$, $\alpha\text{-}Fe_2O_3$ (red oxide) and silicon oxide, and the preferred binder is a thermosetting resin or a reactive resin.

Where the additives are inorganic compounds, a suitable amount is about 30 to 85% by weight and preferably 40 to 80% by weight based on the total solids content of the back layer. Where the additives are organic compounds, a suitable amount is about 0.1 to 30% by weight and preferably 0.2 to 20% by weight based on the total solids content of the back layer. Further, a suitable dry thickness for the back layer ranges from about 0.5 to 5.0 μm depending on the total thickness, use, shape or purpose of the magnetic recording medium.

Back coating layers are described in, for example, Japanese Pat. Nos. 13411/77 and 17401/77, Japanese Pat. Nos. (OPI) 150407/75, 8005/77, 8006/77, 17003/77, 25603/77, 30403/77, 37405/77, 40303/77 and 40304/77, Japanese Utility Model Publications 6268/77 and 8419/77, Japanese Utility Model Applications (OPI) 13411/77 and 17401/77 and U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688 and 3,761,311.

Suitable methods for forming the above-described magnetic recording layer on the support include air doctor coating, blade coating, air knife coating, squeeze coating, dip coating, reverse roll coating, transfer roll coating, gravure coating, kiss coating, cast coating, spray coating and spin coating, and other methods can be used, as well. These coating techniques are described in detail in *Coating Kogaku,* pages 253–277, Asakura Shoten (Mar. 20, 1971).

Multilayer magnetic recording media are produced by providing two magnetic recording layers on a support by repeating a continuous coating operation which comprises applying a magnetic coating composition to a nonmagnetic support using one of the above-described methods and drying. Further, as described in Japanese Pat. (OPI) No. 98803/73 (corresponding to German Pat. No. DT-OS 2,309,159) and 99233/77 (corresponding to German Pat. No. DT-As 2,309,158), etc., two magnetic recording layers may be coated at the same time using a multilayer simultaneous coating method.

Coating is carried out so that the dry thickness of the magnetic recording layer is about 0.5 to 6 μm. For multilayer magnetic recording media, the sum total of the thickness is within the above described range. Further, the dry thickness depends upon the use, the shape or the standard of the magentic recording media.

After the magnetic recording layer is coated on the support using a method described above, the magnetic recording medium can be subjected to a processing for orienting the ferromagnetic powder in the layer desired, and then the formed magnetic recording layer is dried. Further, if desired, the magnetic recording medium of the present invention can be processed by carrying out a surface smoothing processing or a cutting into a desired shape.

Particularly, in the present invention, it has been found that magnetic recording media having a smooth surface and an excellent wear resistance can be obtained by surface smoothening processing of the magnetic recording layer. This surface smoothening processing can be carried out by a smoothening processing before drying or by a calendering processing after drying.

Orientation of the ferromagnetic powder can be carried out under the following conditions of a direct current or an alternating current orientation magnetic field of about 500 to 3000 Oe, with the direction of the orientation of the magnetic medium depending upon its use. More specifically, in the case of audio tapes, small-sized video tapes or memory tapes, the direction of orientation is parallel to the longitudinal direction of the tapes. In the case of video tapes for broadcasting, the orientation is at an angle of 30°–90° to the longitudinal direction.

Methods of orientation of ferromagnetic powders are described in U.S. Pat. Nos. 1,949,840, 2,796,359, 3,001,891, 3,172,776, 3,416,949, 3,473,960 and 3,681,138 and Japanese Pat. Nos. 3427/57, 28368/64, 23624/65, 23625/65, 13181/66, 13043/73 and 39722/73, etc.

Further, as described in Japanese Pat. No. (OPI) 79905/77, U.S. Pat. No. 3,775,178 or German Pat. No. (DT-AS) 1,190,985, the orientation of an upper layer and that of a lower layer may be in different directions in cases of multilayer magnetic recording media.

The drying temperature of the magnetic recording layer after orientation is at about 50° to 120° C., preferably 70° to 100° C. and particularly 80° to 90° C., with a flow rate of air of 1 to 5 Kl/m² and preferably 2 to 3 kl/m², and with a drying time of about 30 seconds to 10 minutes and preferably 1 to 5 minutes.

For carrying out the smoothening processing of the surface of the coating layer before drying of the magnetic recording layer, a magnetic smoothener, a smoothening coil, a smoothening blade or a smoothening blanket, etc. can be used as necessary. Smoothening processing is described in Japanese Pat. No. 38802/72, British Pat. No. 1,191,424, Japanese Pat. No. 11336/73 and Japanese Pat. No. (OPI) 53631/74, 112005/75 and 77303/76.

The calendering processing of the surface of the coating layer after drying of the magnetic recording layer is preferably carried out by a supercalender method which comprises passing the tape between two rolls such as a metal roll and a cotton roll or a synthetic resin roll (for example, nylon or polyurethane, etc.) or a metal roll and a metal roll, etc. The supercalendering processing preferably is carried out under conditions such that the pressure between the rolls is about 25 to 50 kg/cm², the temperature is about 35° to 150° C. and the processing rate is 5 to 200 m/min. If the temperature and the pressure exceed the above described limits, the magnetic layer and the nonmagnetic support are adversely affected. Further, if the processing rate is less than about 5 m/min., no surface smoothening effect is obtained. If the processing rate is higher than about 200 m/min., processing becomes difficult.

Surface smoothening processing is described in U.S. Pat. Nos. 2,688,567, 2,998,325 and 3,783,023, German Pat. Nos. (OLS) 2,405,222, Japanese Pat. Nos. (OPI) 53631/74, 10337/75, 99506/75, 92606/76, 10204/76 and 103404/76 and Japanese Pat. No. 17404/77, etc.

By using the above described 1,2-epoxyalkane represented by the general formula (I) as a lubricant in the present invention, it becomes possible to provide magnetic recording media which have excellent lubrication properties and stable running properties, with which tape squeaking and blooming do not occur and which have excellent characteristics without adverse influences on the magnetic properties.

The present invention is illustrated in greater detail below by reference to Examples and Comparison Examples. It will be easily understood by those skilled in the art that the components, ratios thereof and operational order can be varied without department from the spirit and scope of the present invention.

It will be also easily understood that the present invention can be applied to other uses such as for video tapes, flexible thin disk sheets [e.g., Floppy Disk (tradename) produced by IBM], open reel audio tapes, audio endless tapes, digital cassette tapes, video tapes for broadcasting, magnet films or memory tapes, etc. Accordingly, the present invention is not to be construed as being limited to the following examples.

In the following Examples and Comparison Examples, all parts, percents, ratios and the like are by weight unless otherwise indicated.

EXAMPLE 1

|  | Parts |
|---|---|
| Co-containing Berthollide Iron Oxide (Co 1.5 atomic % containing FeO$_{1.4}$, Hc : 580 Oe, acicular ratio: 10:1, average particle length: 0.6 μm) | 300 |
| Vinyl Chloride-Vinyl Acetate-Vinyl Alcohol Copolymer (copolymerization ratio (% by weight): 92:3:5; degree of polymerization: about 430) | 30 |
| Oleic Acid | 3 |
| Lubricant | (As shown in Table 1) |
| n-Butyl Acetate | 700 |

The above-described components were put in a ball mill and blended for 24 hours and dispersed. After adding 24 parts of a polyisocyanate prepolymer (the reaction product of a polyalkylene glycol and tolylene diisocyanate) and 6 parts of a polyisocyanate compound [75 wt.% solution in ethyl acetate of an adduct of 3 mols of tolylene diisocyanate and 1 mol of trimethylol propane (molecular weight: about 760, NCO content: 13.3 wt.%); Desmodur L-75 produced by Bayer A. G.], the composition was blended for 1 hour additionally and dispersed. This composition was filtered using a filter having an average opening size of 3 μm to obtain a magnetic coating composition.

The magnetic coating composition obtained as described above was coated on a polyethylene terephthalate film having a thickness of 7 μm using a reverse roll in a dry thickness of 5 μm. Magnetic field orientation processing was carried out before the coating had dried. After the coating had dried, a supercalender roll processing was carried out to smoothen the surface of the magnetic recording layer.

The magnetic recording medium obtained was slit to obtain audio cassette tapes having a width of 3.81 mm.

The 1,2-epoxyalkane used in the magnetic coating and the properties of the audio tapes obtained are shown in Table 1 below where C No. represents a comparison example.

Table 1

| Sample No. | Lubricant | Amount (parts by weight) | Coefficient of Kinetic Friction (a) Load: 20 g | Coefficient of Kinetic Friction (a) Load- 50 g | Tape Squeaking (b) | Running Property (c) | Blooming (d) | Squareness Ratio (Br/Bm) (e) |
|---|---|---|---|---|---|---|---|---|
| C - 1 | — | 0 | 0.86 | Measurement imposible | D | 1 | Absent | 0.84 |
| 1 | (I - 1) | 3 | 0.50 | 0.53 | A | 5 | Absent | 0.84 |
| 2 | (I - 2) | 3 | 0.50 | 0.50 | A | 5 | Absent | 0.84 |
| 3 | (I - 3) | 3 | 0.48 | 0.46 | A | 5 | Absent | 0.85 |
| 4 | (I - 4) | 3 | 0.45 | 0.43 | A | 5 | Absent | 0.85 |
| 5 | (I - 5) | 3 | 0.46 | 0.46 | A | 5 | Absent | 0.84 |
| 6 | (I - 6) | 3 | 0.55 | 0.53 | A | 5 | Some | 0.82 |
| C - 2 | 1,2-Epoxy-tetracontane* | 3 | 0.54 | 0.58 | A | 5 | Present | 0.80 |

Table 1-continued

| Sample No. | Lubricant | Amount | Coefficient of Kinetic Friction (a) Load: 20 g | Coefficient of Kinetic Friction (a) Load: 50 g | Tape Squeaking (b) | Running Property (c) | Blooming (d) | Squareness Ratio (Br/Bm) (e) |
|---|---|---|---|---|---|---|---|---|
| C-3 | Liquid Paraffin | 3 | 0.55 | 0.60 | B | 4 | Present | 0.80 |
| C-4 | α-Olefin Polymerized Oil (molecular weight: about 1650) | 3 | 0.56 | 0.62 | B | 4 | Present | 0.82 |
| C-5 | White Vaseline | 3 | 0.64 | 0.70 | C | 2 | Present | 0.78 |
| C-6 | Paraffin (m.p.: about 50° C.) | 3 | 0.50 | 0.50 | B | 4 | Present | 0.75 |

*Compound represented by the general formula (I) where the number of carbon atoms in R is 40. $CH_3-(CH_2)_{38}-CH_2-\underset{\underset{O}{\diagdown\diagup}}{CH}-CH_2$ The methods of measuring the characteristics shown in Table 1 are described below.

(a) Coefficient of Kinetic Friction

The value measured obtained using an apparatus having the structure shown in the Figure (The measurement for Sample C-1 was impossible where the load was 50 g, because the coefficient of kinetic friction was too high). In the Figure, A is a Permalloy bar having a diameter of 20 mm, the surface of which was polished to a mirror surface. This bar was rotated (45.4 r.p.m.) and the sample tape B was rubbed at a relative rate of 4.75 cm/sec. (to correspond to the friction between the head of an audio cassette tape recorder and a tape). C is a tension detecting means. D is a weight (load) for providing tension to the tape. The coefficient of kinetic friction was calculated from the following relationship $$\text{Coefficient of Kinetic Friction } (\mu) = \frac{1}{\pi} \ln \frac{W}{W_o}$$

where $W_o$ represents the load of the weight D and $W$ represents the tension detected by C. The measurement was carried out under a load of 20 g and 50 g.

(b) Tape Squeaking

Each sample tape was put in a Phillips type compact cassette, and measurement was carried out using 20 different commercially available cassette decks (tape speed: 4.75 cm/sec.). The results were evaluated on the following scale.
A-No tape squeaking;
B-Squeaking occurred in 1 to 5 decks;
C-Squeaking occurred in 5 to 10 decks;
D-Squeaking occurred in all decks.

(c) Running Property

The stoppage of each tape due to poor running and the condition of tape winding (the condition of the side face of the wound tape) were measured simultaneously with the measurement of tape squeaking. The results were evaluated using the following scale.
5-No stopping and disorder of the wound face (excellent);
4-No stopping but some disorder occurred on the wound face (fairly excellent);
3-No stopping but some disorder occurred (good);
2-Running stopped after the tape had been stopped about 10 times during running and a large amount of disorder occurred on the wound face (fairly bad);
1-Running stopped after the tape had been stopped about 5 times during running and a very large amount of disorder occurred on the wound face (bad).

(d) Blooming

Each sample tape was wound up under a tension of 500 g. After the tape was allowed to stand at 40° C. and 80% RH for 24 hours, the tape was cooled to room temperature (at 25° C. and 60% RH) and blooming on the surface of the magnetic recording layer was measured. Blooming is indicated in Table 1 by its presence or absence.

(e) Squareness Ratio (Br/Bm)

The ratio of the residual magnetic flux density (Br) to the maximum magnetic flux density (Bm) in an external magnetic field of 2 K Oe was obtained using an oscillation sample type fluxmeter (VSM-Type III, produced by Toei Kogyo Co.).

EXAMPLE 2

The 1,2-epoxyalkane used in the present invention was used as a lubricant in a magnetic recording layer coating composition as described in Example 1. The results obtained are shown in Table 2 (Sample No. 7 and No. 8). For comparison, Sample Nos. 1, 2, 3 and 4 are also shown in Table 2.

Table 2

| Sample No. | Lubricant | Amount (parts by weight) | Coefficient of Kinetic Friction (a) Load: 20 g | Coefficient of Kinetic Friction (a) Load: 50 g | Tape Squeaking (b) | Running Property (c) | Blooming (d) | Squareness Ratio (Br/Bm) (e) |
|---|---|---|---|---|---|---|---|---|
| 1 | (I-1) | 3 | 0.50 | 0.53 | A | 5 | Absent | 0.84 |
| 2 | (I-2) | 3 | 0.50 | 0.50 | A | 5 | Absent | 0.84 |
| 7 | Mixture of (I-1) and (I-2) (weight ratio: 6:4) | 3 | 0.49 | 0.50 | A | 5 | Absent | 0.84 |

Table 2-continued

| Sample No. | Lubricant | Amount | Coefficient of Kinetic Friction (a) Load: 20 g | Load: 50 g | Tape Squeaking (b) | Running Property (c) | Blooming (d) | Squareness Ratio (Br/Bm) (e) |
|---|---|---|---|---|---|---|---|---|
| 3 | (I - 3) | 3 | 0.48 | 0.46 | A | 5 | Absent | 0.85 |
| 4 | (I - 4) | 3 | 0.45 | 0.43 | A | 5 | Absent | 0.85 |
| 8 | Mixture of (I-3) and (I-4) (weight ratio: 6:4) | 3 | 0.46 | 0.44 | A | 5 | Absent | 0.85 |

(a) to (e) as described for Table 1.

EXAMPLE 3

The amount of the 1,2-epoxyalkane used in the present invention added as a lubricant was varied in the magnetic recording layer coating composition in Example 1. The results are shown in Table 3 below (Sample Nos. 9, 10 4 and 11). For comparison, the results obtained where no lubricant was added (Sample No. C-1 in Example 1) are also shown in Table 3.

Table 3

| Sample No. | Lubricant | Amount (parts by weight) | Coefficient of Kinetic Friction (a) Load: 20 g | Load: 50 g | Tape Squeaking (b) | Running Property (c) | Blooming (d) | Squareness Ratio (Br/Bm) (e) |
|---|---|---|---|---|---|---|---|---|
| C - 1 | — | 0 | 0.86 | Measurement impossible | D | 1 | Absent | 0.84 |
| 9 | (I - 4) | 0.3 | 0.54 | 0.60 | B | 5 | Absent | 0.84 |
| 10 | (I - 4) | 1 | 0.46 | 0.45 | A | 5 | Absent | 0.84 |
| 4 | (I - 4) | 3 | 0.45 | 0.43 | A | 5 | Absent | 0.85 |
| 11 | (I - 4) | 9 | 0.44 | 0.42 | A | 5 | Some | 0.82 |

(a) to (e) as described for Table 1.

From the results obtained for Examples 1–3 (Sample Nos. 1–11) and for the comparison examples (Sample Nos. C-1–C-6) it can be seen that audio cassette tapes employing the 1,2-epoxyalkanes used in the present invention are improved in terms of freedom from blooming, lubrication properties and running properties.

Further, it has been found that a particularly excellent effect is obtained where the alkyl group R in the 1,2-epoxyalkanes has 12 to 20 carbon atoms.

It has also been confirmed that the 1,2-epoxyalkanes used in the present invention do not cause a decrease in the squareness ratio of the magnetic recording layer. Further, it has been found that the same effect is obtained when two 1,2-epoxyalkanes are used together.

From the above described results, it can be seen that audio cassette tapes having a high quality, which could not be obtained hitherto, can be provided by employing the 1,2-epoxyalkanes used in the present invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic recording layer containing a finely divided ferromagnetic powder, a binder and at least one 1,2-epoxyalkane represented by the general formula (I)

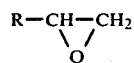     (I)

wherein R represents an alkyl group having 10 to 30 carbon atoms; in an amount of about 0.05 to about 3 parts by weight per 100 parts by weight of the ferromagnetic powder.

2. The magnetic recording medium of claim 1, wherein R is a straight chain alkyl group or a branched chain alkyl group.

3. The magnetic recording medium of claim 2, wherein said alkyl group is a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, a heneicosyl group, a docosyl group, a tricosyl group, a tetracosyl group, a pentacosyl group, a hexacosyl group, a heptacosyl group, an octacosyl group, a nonacosyl group, or a triacontyl group.

4. The magnetic recording medium of claim 1, wherein said 1,2-epoxyalkane is 1,2-epoxydodecane, 1,2-epoxytetradecane, 1,2-epoxyhexadecane, 1,2-epoxyoctadecane, 1,2-epoxydocosane or 1,2-epoxydotriacontane.

5. The magnetic recording medium of claim 1, wherein said ferromagnetic powder is a ferromagnetic iron oxide, a ferromagnetic chromium dioxide or a ferromagnetic alloy powder.

6. The magnetic recording medium of claim 5, wherein said ferromagnetic iron oxide is an iron oxide represented by the formula $FeO_x$ wherein x is in the range of $1.33 \leq x \leq 1.50$, which may contain up to about 10 atomic % of Cr, Mn, Co, Ni, Cu or Zn, as a divalent metal, said ferromagnetic chromium dioxide is $CrO_2$ in which up to about 20% by weight of Na, K, Ti, V, Mn, Fe, Co, Ni, Tc, Ru, Sn, Ce, Tb, P, Sb or Te, or an oxide thereof may be present, and said ferromagnetic alloy powder contains more than about 75% by weight of at least one ferromagnetic metal and about 20% by weight or less of Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B or P.

* * * * *